United States Patent [19]
Allen et al.

[11] Patent Number: 5,768,633
[45] Date of Patent: Jun. 16, 1998

[54] TRADESHOW PHOTOGRAPHIC AND DATA TRANSMISSION SYSTEM

[75] Inventors: James D. Allen; Omid A. Moghadam; John R. Squilla, all of Rochester, N.Y.

[73] Assignee: Eastman Kodak Company, Rochester, N.Y.

[21] Appl. No.: 707,265

[22] Filed: Sep. 3, 1996

[51] Int. Cl.$^6$ ............................................. G03B 15/00
[52] U.S. Cl. ........................ 396/2; 396/57; 396/310; 396/297
[58] Field of Search ................... 396/56, 57, 310, 396/311, 319, 297, 300, 1, 2, 3; 348/64

[56] References Cited

U.S. PATENT DOCUMENTS

| | | | |
|---|---|---|---|
| 4,471,382 | 9/1984 | Toyoda et al. | 358/183 |
| 4,884,094 | 11/1989 | Kitaura et al. | 354/412 |
| 4,957,348 | 9/1990 | May | 350/321 |
| 5,194,892 | 3/1993 | Robison | 355/40 |
| 5,264,822 | 11/1993 | Vogelman et al. | 340/286.01 |
| 5,296,884 | 3/1994 | Honda et al. | 354/106 |
| 5,300,978 | 4/1994 | Miyasaka | 354/412 |
| 5,381,207 | 1/1995 | Kazumi | 354/412 |
| 5,392,223 | 2/1995 | Caci | 364/514 |
| 5,479,228 | 12/1995 | Tamamura et al. | 354/106 |
| 5,506,644 | 4/1996 | Suzuki et al. | 354/106 |
| 5,541,656 | 7/1996 | Kare et al. | 348/334 |
| 5,546,122 | 8/1996 | Asami et al. | 348/96 |
| 5,565,957 | 10/1996 | Goto | 396/48 |
| 5,634,144 | 5/1997 | Mauro et al. | 396/57 |

*Primary Examiner*—Safet Metjahic
*Assistant Examiner*—John Chizmar
*Attorney, Agent, or Firm*—David M. Woods

[57] ABSTRACT

In a photographic and data transmission system utilizing a wireless communication system, a camera used with the wireless system includes film or electronic sensor for capturing an image, a receiver for receiving a wireless signal from the wireless communication system, a decoder for decoding the wireless signal obtained by the receiver and magnetic layer on film or electronic storage device for storing the decoded wireless signal and the image. A trigger signal from the camera can be used to initiate transmission of the wireless signal from the wireless communication system. Moreover, the wireless signal preferably contains an internet address for accessing further information about an item being photographed. Such a camera is of particular use in a tradeshow for conveying information between a wireless communication system in a display booth and a camera brought to the booth by a tradeshow visitor.

26 Claims, 7 Drawing Sheets

TRADESHOW PHOTOGRAPHIC AND DATA TRANSMISSION SYSTEM

FIELD OF THE INVENTION

The invention relates generally to the field of photography, and in particular to an electronic photographic system further capable of data transmission and a camera capable of capturing and storing images and the transmitted data simultaneously.

BACKGROUND OF THE INVENTION

It is known in the art that a film or an electronic camera can record image information on either a film or store the information in electronic memory. It is also known in the art that a wireless transceiver can be used to transmit and receive data. An example of such a device is shown in U.S. Pat. No. 4,957,348. Digital cameras also have the capability of storing additional information along with the digital image. An example of this is the Kodak DCS 460 digital camera, which is capable of storing voice annotation along with the digital image. Moreover, the film used by the Advanced Photo System#, which is sold by the Eastman Kodak Company, allows a film camera to store digital information on a clear magnetic coating on the photographic film. This feature is disclosed in U.S. Pat. No. 5,194,892.

Many participants of trade shows today take a camera to capture images of the products or booths that they have an interest in. These images are a reminder of the physical characteristic of the product. They are also used at a later time in desktop publishing of compound documents or perhaps for electronic publication of a report. Exhibitors at the show also publish color brochures to be distributed at the show to advertise their products. The cost of printing these brochures has increased in the past few years. A lot of these brochures are thrown away at the end of the show, which decreases their effectiveness as an advertising tool and also adds to the overall cost. Many companies are now posting information about their products to an internet site, where customers can dial into and download the information they need to a personal computer. Besides needing to obtain URL addresses for the location of these information sites, this also means that the customer needs to go through many pages of information before the needed information is found.

It would be desirable to find a convenient way to combine the information handling capability of modern cameras with image recording so that information can easily be accessed about a photographed item.

SUMMARY OF THE INVENTION

The present invention is directed to overcoming one or more of the problems set forth above. Briefly summarized, according to one aspect of the present invention, a camera used with a wireless communication system includes: means for capturing an image; a receiver for receiving a wireless signal from the wireless communication system; a decoder for decoding the wireless signal obtained by the receiving means; and an image recording section for storing the decoded wireless signal and the image.

In one embodiment, the camera is an electronic camera, the capture means is an electronic sensor, and the image recording section is an electronic storage device. In another embodiment, the camera is a film camera, the capture means is a photographic film having an emulsion for capturing the image and the image recording section is a magnetic storage area on the film. In either embodiment, a trigger signal from the camera can be used to initiate transmission of the wireless signal from the wireless communication system. Moreover, the wireless signal preferably contains an internet address for accessing further information about an item being photographed.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
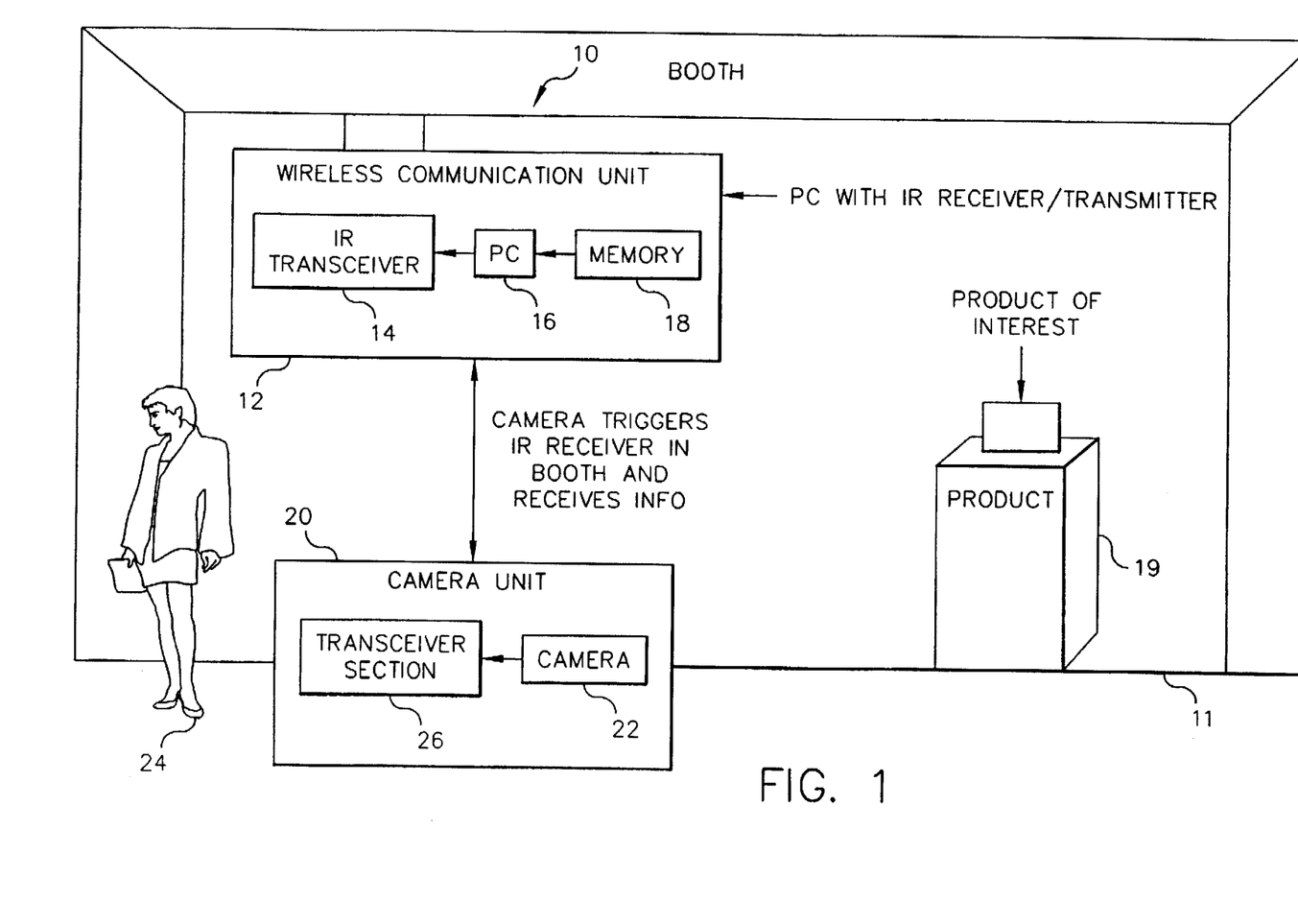
FIG. 1 is a diagram of a photographic and data transmission system for use according to the invention at a tradeshow.

Beginning with FIG. 1, the photographic and data transmission system is shown to include two main parts, or subsystems. The first part is a wireless communication system, generally referred to as the data unit 10, installed at a booth 11 at a trade show. The data unit 10 includes a wireless communication unit 12 for generating a wireless signal. Preferably the wireless communication unit 12 includes an infrared transceiver 14 connected to a microprocessor-based personal computer 16 for generating an infrared wireless signal. The computer 16 is capable of receiving information from the transceiver 14 and executing software programs stored in a memory 18. The information stored on the computer's memory 18 includes information related to a product 19 on display, such as the product name, company name, the price of the product, and the Uniform Resource Locator (URL) address of the product catalogue on the internet system.

Figure 2:
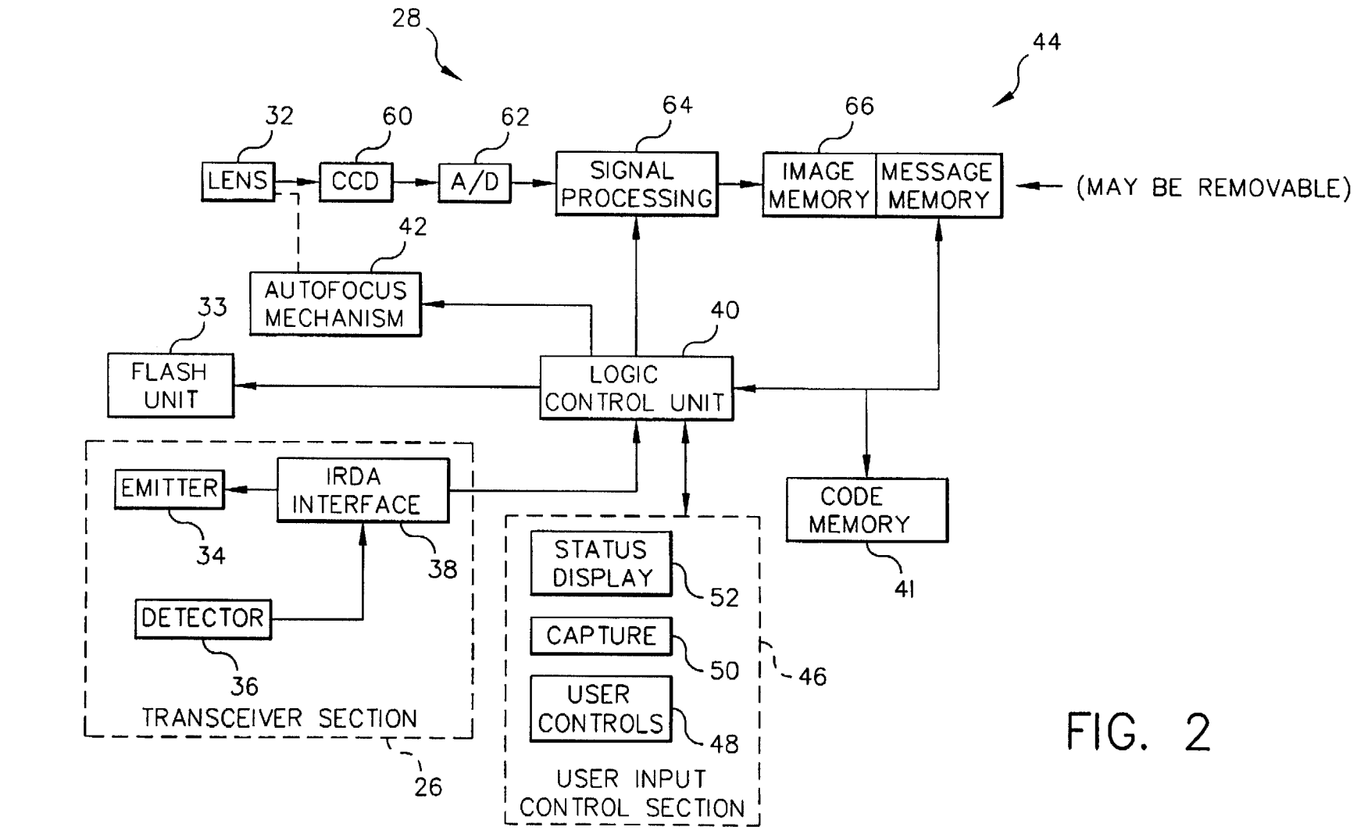
FIG. 2 is a block diagram of a digital camera useful in the system shown in FIG. 1.
Figure 3:
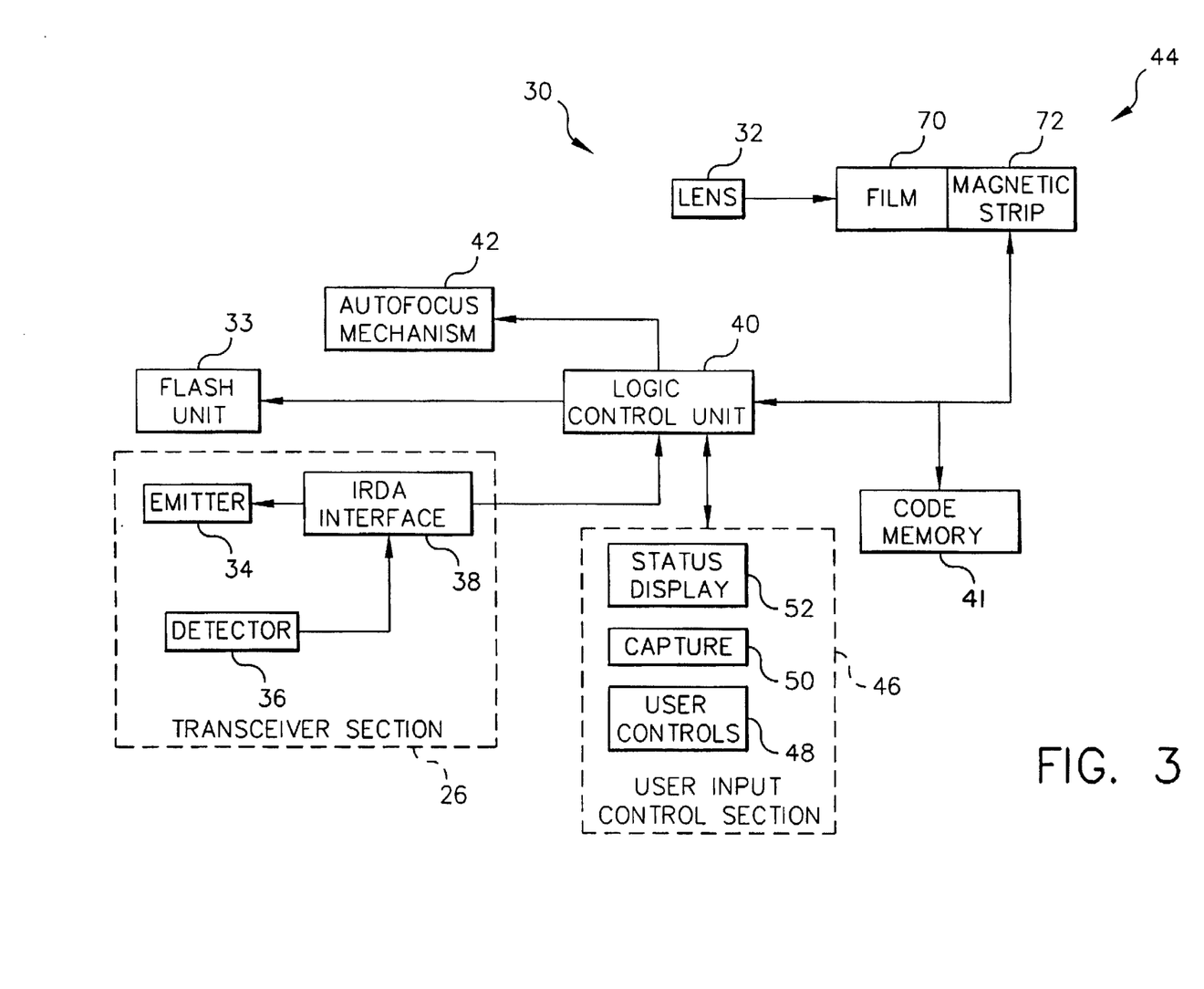
FIG. 3 is a block diagram of a film camera useful in the system shown in FIG. 1.

The second part, or subsystem, of the photographic and data transmission system is a wireless reception system, generally referred to as the camera unit 20. The camera unit 20 includes a camera 22 brought into the vicinity of the trade show booth 11 by a trade show visitor 24. The camera 22 is capable of receiving information wirelessly through a transceiver section, preferably an infrared signal received by an infrared transceiver section 26 located in or on the camera. Preferably, the camera is either a digital camera 28 as shown in FIG. 2 (such as a Kodak DCS 50 digital camera) or an Advanced Photo System⌒ camera 30 as shown in FIG. 3 (such as a Kodak 3700 camera) with the wireless reception and storage enhancement as described according to the invention. Both types of cameras capture an image of an object through a lens 32, using a flash unit 33 as needed, and include the transceiver section 26 for communicating with the data unit subassembly. The transceiver section 26 includes an infrared emitter 34 and an infrared detector 36 connected through an IrDA interface 38 to a logic control unit 40 in the camera. The transceiver section 26, in combination with the logic control unit 40, decodes an infrared signal received by the infrared detector 36. Data regarding used in the camera 22 is stored in a code memory 41. Although not required, the camera 22 may include an autofocus mechanism 42 driven, e.g., by infrared data from an infrared source and receptor (not unlike the transceiver section 26).

For both types of cameras, the captured image is stored in an image recording section 44 (e.g., film, magnetic, solid state, etc.), where information identifying the product 19 can also be attached to the image. In particular, the logic control unit 40 receives input instructions from a user input control section 46, which includes user input controls 48, a capture release 50 and a status display 52 that allows user selection of capture features, such as flash on/off, and so forth. For purpose of this invention, the images are taken by the camera 22 after the user has selected a wireless communication feature on the status display 52 by using the user input controls 48 to select an appropriate icon representative of the feature. The user then actuates the capture release 50, the camera 22 captures the selected picture, the appropriate product information is appended to the image in the image recording section 44.

As shown in FIG. 2, the digital camera 28 captures each image on a charge-coupled device (CCD) 60, digitizes the image in an analog-to-digital (A/D) converter 62, and processes the digital image in a signal processing section 64 for storage in the image recording section 44, which may be an output memory 66, such as internal Flash EEPROM or a removable memory card. In accordance with the invention, the logic control unit 40 drives the signal processing section 64 to store the information related to the product in the output memory 66 along with the digital image. An "extra data" bit is also stored to permit a downstream processor to determine that additional product data is included with the image. As shown in FIG. 3, the Advanced Photo System# camera 30 captures each image on a film 70 and, in accordance with the invention, stores the digital product information provided by the logic control unit 40 on a magnetic coating 72 on the back of the film 70. Either of these camera subsystems is generally intended to be the camera unit 20.

Figure 4:
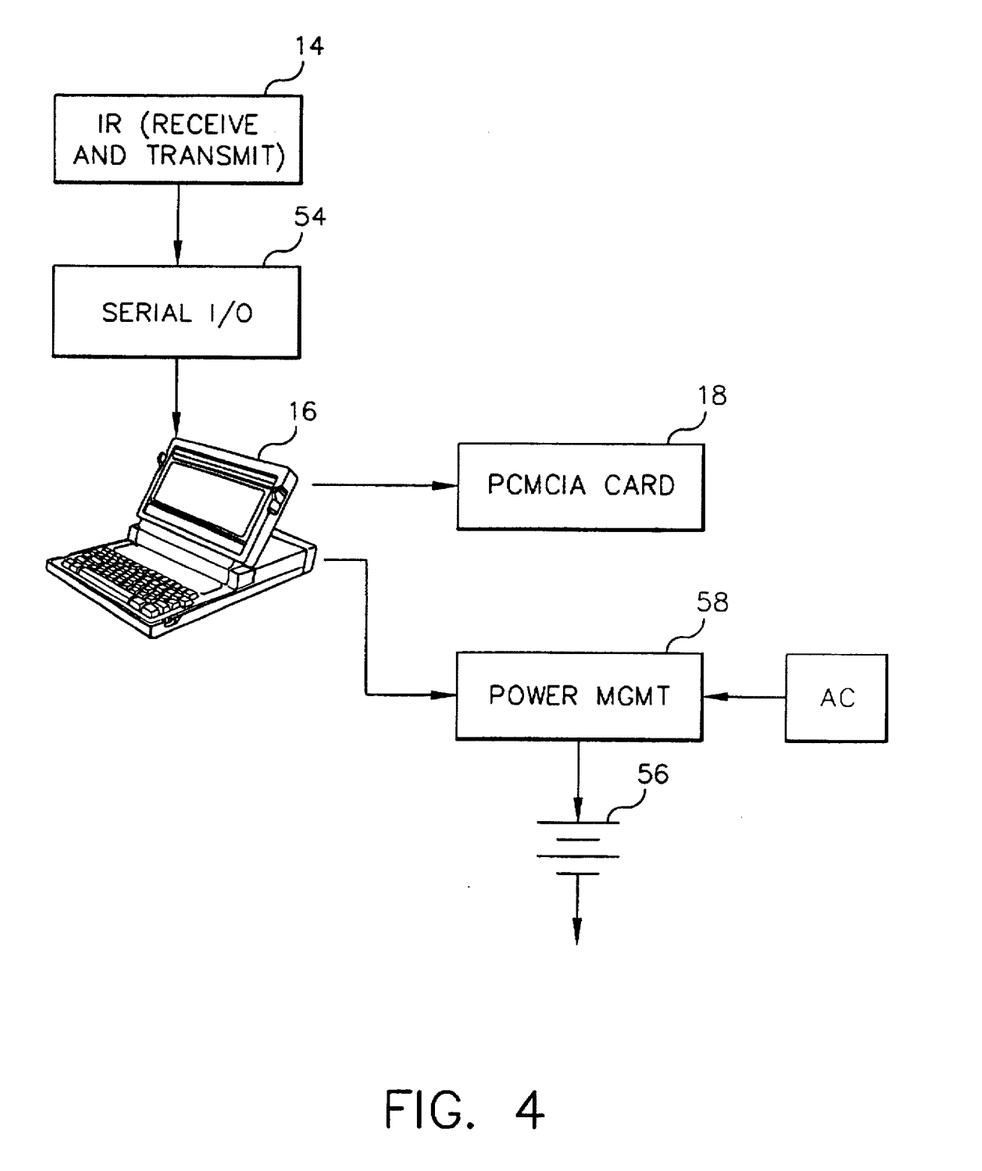
FIG. 4 is a diagram of a data unit used in the system shown in FIG. 1.
Figure 5:
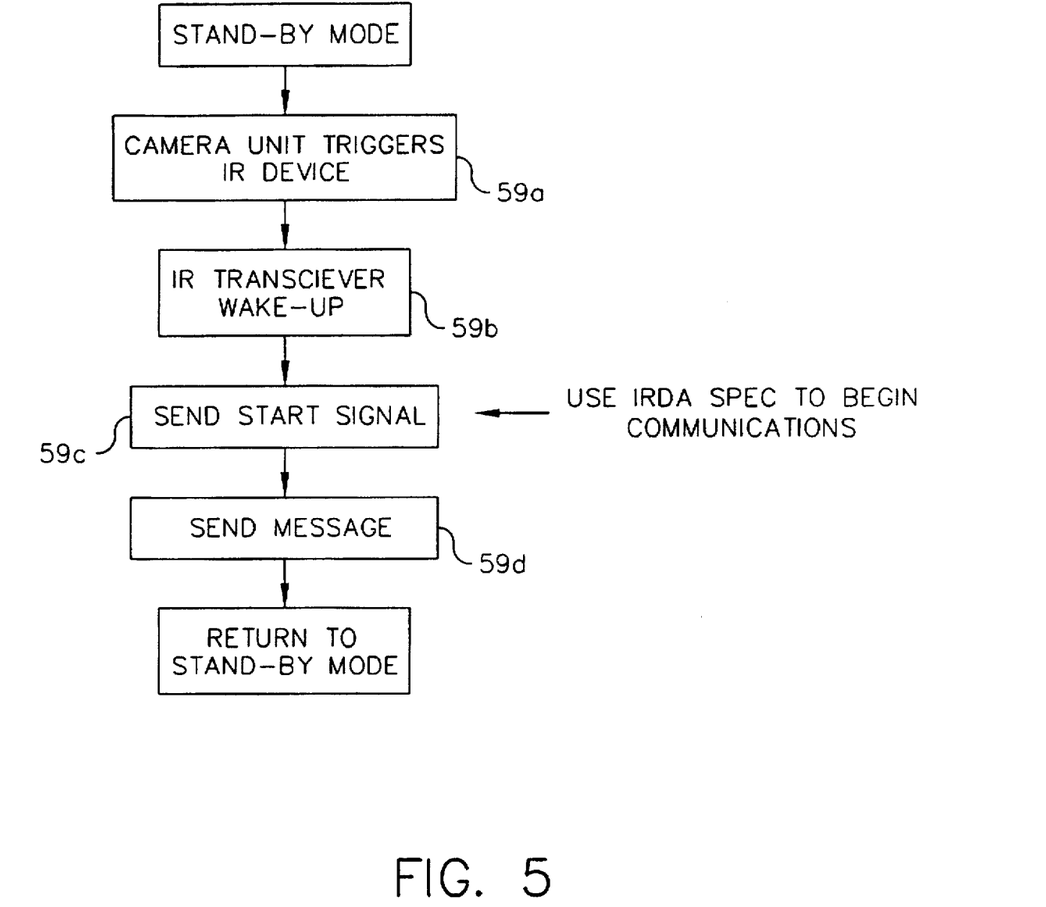
FIG. 5 is a flow diagram of the operation of the data unit shown in FIG. 4.

The data unit 10 shown in FIG. 4 includes the aforementioned IR transceiver 14, the computer 16, and the memory 18. The IR data is transferred between the transceiver 14 and the computer 16 through a conventional serial interface 54. If the memory is a removable PCMCIA memory card, product data can be easily input to the computer 16. Power is supplied by a battery 56 connected through an AC driven power management section 58. In practice, as shown in FIG. 5, the data unit 10 is triggered by the camera unit 20 to transmit the data stored in its memory 18. In particular, a signal from the camera triggers the IR transceiver section 26 (in step 59a) and causes the IR transceiver section to awaken (step 59b). This can be achieved in a number of ways. One way is to use the camera's infrared focusing mechanism 42 as the trigger signal for data transmission. Indeed, as described in copending Ser. No. 08/268,691 entitled "A Light Beam Communication Method and System for Linking a Camera and a Computer" and assigned to the same assignee as the present invention, an existing light beam autofocus system of a conventional camera can be adapted to provide a light beam communication linkage with the adapted camera. Another way is to use the camera flash unit 33 as the triggering signal. A light detector can be used with the data unit 10 to trigger the data transmission. Once the transceiver section 26 is awakened, the data unit 10 transmits a start signal (step 59c) and proceeds to transmit the message data to the camera unit (step 59d).

Figure 6:
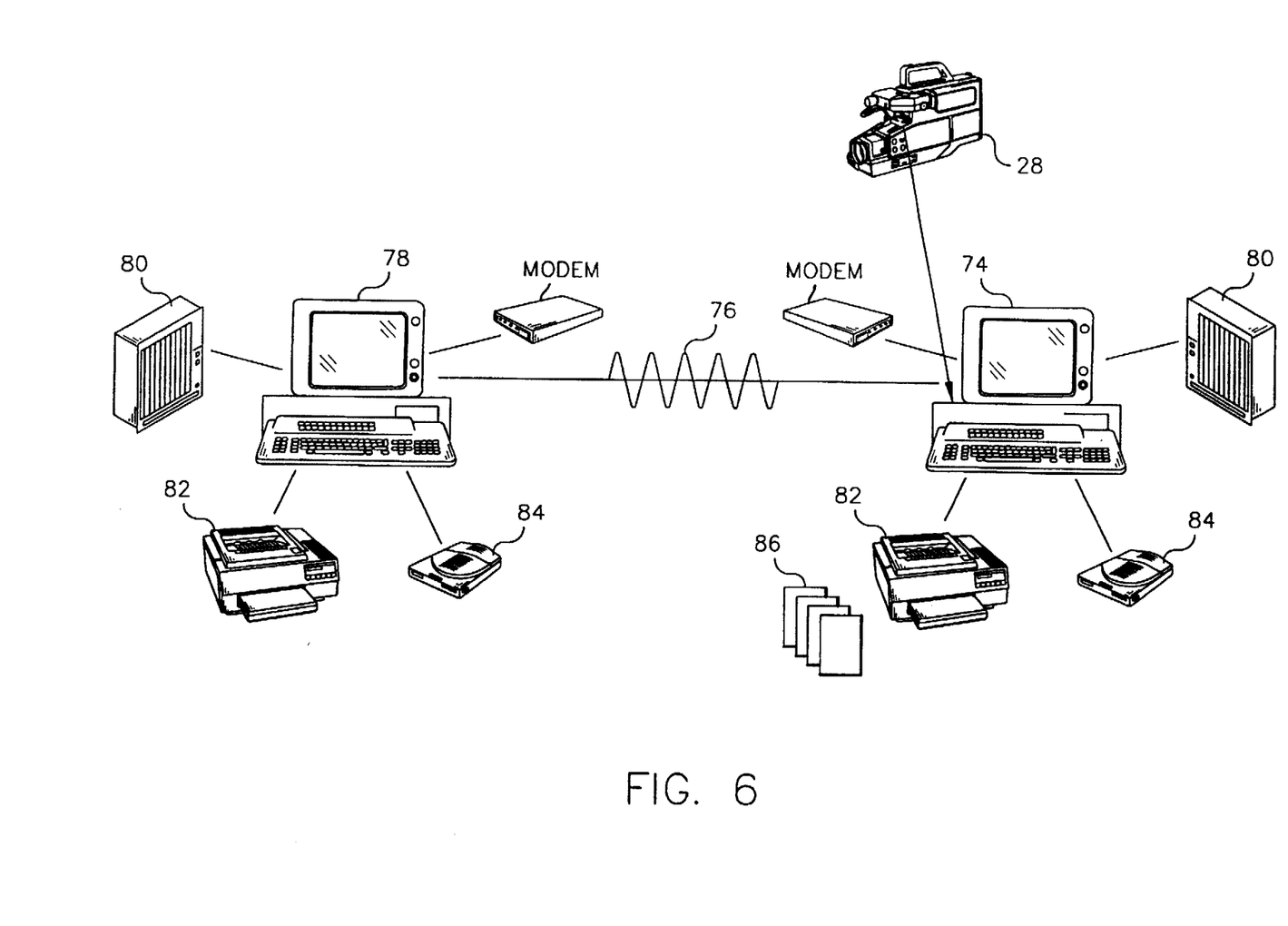
FIG. 6 is a diagram of downstream processing of data captured by a digital camera.

In the digital camera case, as shown in FIG. 6, once the images captured at the trade show are downloaded from the camera 22 to a host computer 74 capable of image processing and transmission, the presence of an "extra data" bit in the image record is sensed by the host computer 74, and a telecommunication connection 76 is made to a network server 78 using the URL addresses stored along with the image. The network server 78 has stored in its memory 80 product information input from the trade show booth sponsor. (The product information could likewise be input across the telecommunications connection 76 or by other conventional means.) All the information stored in the network server 78 at the particular URL address is downloaded through the telecommunications connection 76 to the host computer 74 and stored with the image. This information is printed later on using a color printer 82 or stored on removable media 84, such as a writable CD. The trade show visitor 24 thus has access to catalog material (e.g., hardcopy 86, or soft copy from the media 84 or a display on the host computer 74) without having to carry the materials from the trade show.

Figure 7:
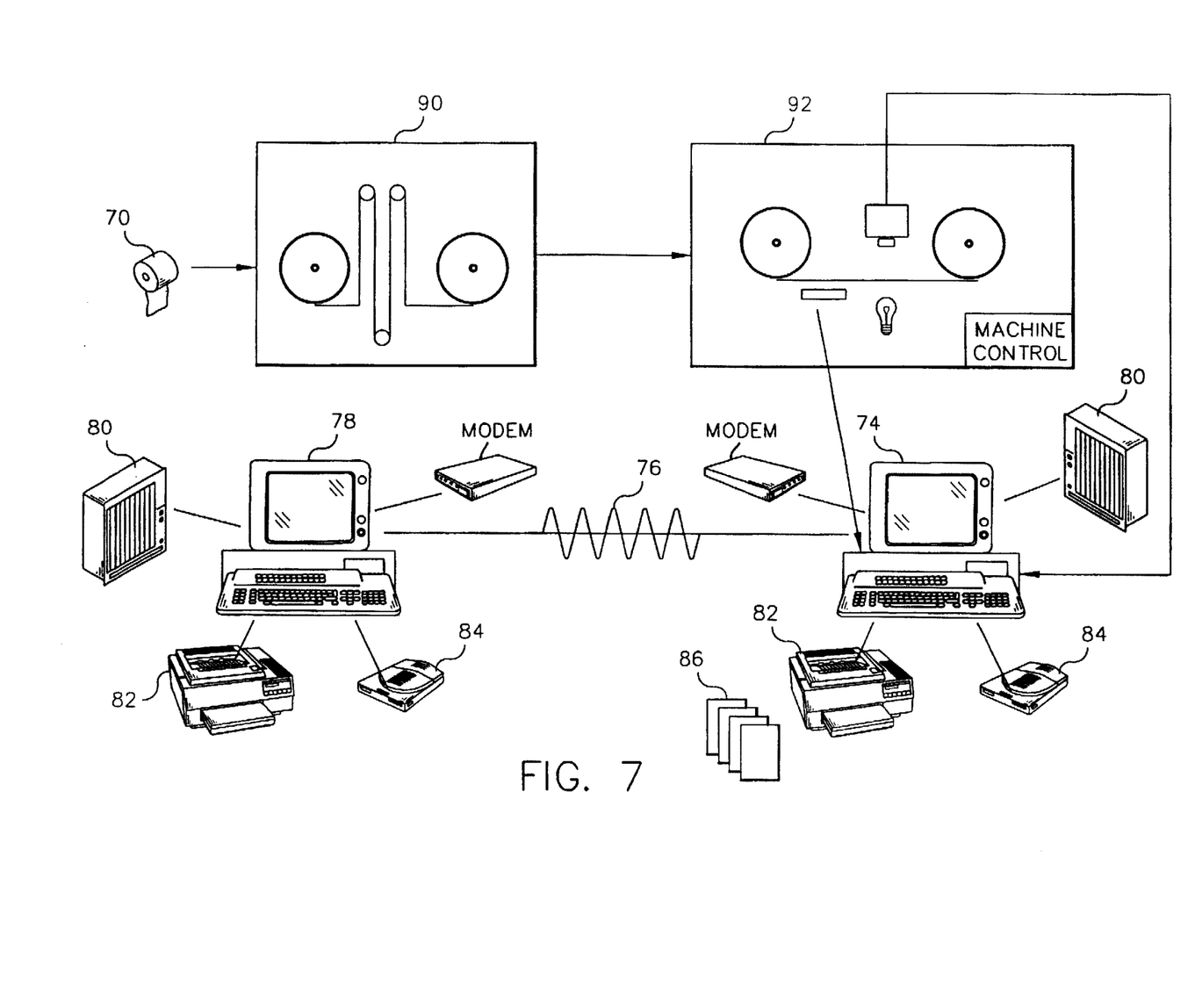
FIG. 7 is a diagram of downstream processing of data captured by a film camera.

In the case of the Advanced Photo System# camera unit, as shown in FIG. 7, the transmitted data is stored on the magnetic portion 72 of the photographic film 70. Once the film is processed in a film processor 90, the developed film is scanned by a film scanner 92 When the film scanner 92 senses the presence of the "extra data" bit, this tells the system that extra data is stored on the magnetic portion 72 of the film. This data is then read by the scanner 92 and downloaded to the host computer 74. Thereafter, the process is similar to that outlined in connection with FIG. 6, i.e., the telecommunication connection 76 is made, and the data at the URL site on the network server 78 is downloaded to the host computer 74. In this case, however, the data may be sent back to the processing station to be printed along with the photographs. In a preferred embodiment, the film scanner 92 also allows for digitization of the images captured on film. This will give the customer the extra benefit of getting the information and images in either hardcopy print format or have it stored on one of many formats of removable media such as CD-R.

The invention has been described with reference to a preferred embodiment. However, it will be appreciated that variations and modifications can be effected by a person of ordinary skill in the art without departing from the scope of the invention.

Parts List 10 data unit
11 booth
12 wireless communication unit

14 IR transceiver
16 PC
18 memory
19 product
20 camera
22 camera unit
24 trade show visitor
26 transceiver section
28 digital camera
30 Advanced Photo System# camera
32 lens
33 flash unit
34 IR emitter
36 IR detector
38 IrDA interface
40 logic control unit
41 code memory
42 infrared focusing mechanism
44 image recording section
46 user input control section
48 user input controls
50 capture release
52 status display
54 serial interface
56 battery
58 power management section
60 CCD
62 A/d converter
64 signal processing section
66 output memory
70 film
72 magnetic coating
74 host computer
76 telecommunications connection
78 network server
80 memory
82 color printer
84 removable media
86 hardcopy
90 film processor
92 film scanner

We claim:

1. A camera for use with an external wireless communication system that is physically separated from the camera, said camera comprising:

means for capturing an image;

means operative contemporaneously with the capturing means for signaling the external wireless communication system to initiate transmission of a wireless signal;

means for receiving the wireless signal from the external wireless communication system, wherein the wireless signal contains data pertaining to the subject matter of the captured image;

means for decoding the wireless signal obtained by the receiving means; and means for storing the decoded wireless signal and the image.

2. The camera as claimed in claim 1 wherein the camera is an electronic camera, the capture means is an electronic sensor, and the storing means is an electronic storage device.

3. The camera as claimed in claim 1 wherein the camera is a film camera, the capture means is a photographic film having an emulsion for capturing the image and the storing means is a magnetic storage area on the film.

4. The camera as claimed in claim 1 wherein wireless signal is an infrared signal and the receiving means is an infrared receiving means.

5. The camera as claimed in claim 1 wherein the wireless signal contains an internet address for accessing further information about the item.

6. A camera for use with an external wireless communication system that is physically separated from the camera, said camera comprising:

means for capturing an image;

means operative contemporaneously with the capturing means for emitting a trigger signal that initiates transmission of a wireless signal from the wireless communication system;

means for receiving the wireless signal from the external wireless communication system, wherein the wireless signal contains data pertaining to the subject matter of the captured image;

means for decoding the wireless signal obtained by the receiving means; and means for storing the decoded wireless signal with the image.

7. The camera as claimed in claim 6 wherein the camera is an electronic camera, the capture means is an electronic sensor, and the storing means is an electronic storage device.

8. The camera as claimed in claim 6 wherein the camera is a film camera, the capture means is a photographic film having an emulsion for capturing the image and the storing means is a magnetic storage area on the film.

9. The camera as claimed in claim 6 wherein wireless signal is an infrared signal and the receiving means is an infrared receiving means.

10. The camera as claimed in claim 6 wherein the trigger signal and the wireless signal are infrared signals and the emitting means and receiving means are together an infrared transceiver.

11. The camera as claimed in claim 6 further including a flash unit and wherein the trigger signal is a flash from the flash unit.

12. The camera as claimed in claim 6 wherein the wireless signal contains an internet address for accessing further information about the item.

13. An electronic camera for use with an external infrared wireless communication system that is physically separated from the camera, said camera comprising:

an electronic sensor for capturing an image;

an emitter operative contemporaneously with the electronic sensor for emitting a trigger signal that initiates transmission of a wireless signal from the external wireless communication system;

an infrared receiver for receiving the wireless signal from the wireless communication system, wherein the wireless signal contains data pertaining to the subject matter of the captured image;

a decoding section for generating a decoded signal from the wireless signal obtained by the receiving means; and a storage device for storing the decoded signal with the image.

14. A film camera for use with an external infrared wireless communication system that is physically separated from the camera, the film having a photographic recording region and a magnetic recording region, said camera comprising:

means for capturing an image on the film;

an emitter operative contemporaneously with the capturing means for emitting a trigger signal that initiates transmission of an infrared wireless signal from the external wireless communication system;

a receiver for receiving the wireless signal from the wireless communication system, wherein the wireless signal contains data pertaining to the subject matter of the captured image;

means for converting the wireless signal obtained by the receiving means into a magnetic signal; and means for storing the magnetic signal on the magnetic recording region on the film.

15. A photographic and data transmission system for conveying information between an external data unit and a camera unit that is physically separated from the data unit, said data unit comprising:

a storage device for storing data about at least one item;

a wireless communication system for generating a wireless signal containing data about the item, wherein said wireless communication system is responsive to use of the camera unit for initiating the wireless signal; and a computer for accessing the data from the storage device and applying the accessed data to the wireless communication system; and said camera unit comprising:

means for capturing an image of the item;

means operative contemporaneously with the capturing means for signaling the external wireless communication system to initiate transmission of the wireless signal;

means for receiving the wireless signal from the wireless communication system;

means for decoding the wireless signal obtained by the receiving means; and means for storing the decoded wireless signal containing data about the item with the image of the item.

16. The photographic and data transmission system as claimed in claim 15 wherein the wireless signal contains an internet address for accessing further information about the item.

17. The photographic and data transmission system as claimed in claim 15 wherein the camera unit is an electronic camera, the capture means is an electronic sensor, and the storing means is an electronic storage device.

18. The photographic and data transmission system as claimed in claim 15 wherein the camera unit is a film camera, the capture means is a photographic film having an emulsion for capturing the image and the storing means is a magnetic storage area on the film.

19. A tradeshow photographic and data transmission system for conveying information between a data unit in a display booth and a camera unit brought near to the booth by a tradeshow visitor, said data unit comprising:

a storage device for storing data about at least one product on display in the trade show booth;

a wireless communication system for generating a wireless signal containing data about the product, wherein said wireless communication system initiates the wireless signal in response to use of the camera unit by the tradeshow visitor; and a computer for accessing the data from the storage device and applying the accessed data to the wireless communication system; and said camera unit comprising:

means for capturing an image of the product;

means operative contemporaneously with the capturing means for signaling the wireless communication system to initiate transmission of the wireless signal;

means for receiving the wireless signal from the wireless communication system;

means for decoding the wireless signal obtained by the receiving means; and means for storing the decoded wireless signal containing data about the product with the image of the product.

20. The tradeshow photographic and data transmission system as claimed in claim 19 wherein the wireless signal contains an internet address for accessing further information about the product.

21. The tradeshow photographic and data transmission system as claimed in claim 19 wherein the camera unit is an electronic camera, the capture means is an electronic sensor, and the storing means is an electronic storage device.

22. The tradeshow photographic and data transmission system as claimed in claim 19 wherein the camera unit is a film camera, the capture means is a photographic film having an emulsion for capturing the image and the storing means is a magnetic storage area on the film.

23. A method for conveying information between a data unit in a display booth at a tradeshow and a camera unit brought near to the booth by a tradeshow visitor, said method comprising the steps of:

storing data at the data unit about at least one product on display in the trade show booth;

capturing an image of the product by use of the camera unit;

generating, contemporaneously with use of the camera unit, a wireless signal from the data unit containing data about the product;

receiving the wireless signal at the camera unit from the wireless communication system;

decoding the wireless signal obtained by the receiving step; and storing the decoded wireless signal containing data about the product with the image of the product.

24. A camera system for use with an external wireless communication system that is physically separated from the camera system, said camera system comprising a signaling module and a capture module, said signaling module comprising means operative contemporaneously with operation of the capture module for signaling the wireless communication system to initiate transmission of a wireless signal; and said capture module comprising:

means for capturing an image;

means for receiving the wireless signal from the external wireless communication system; and means for storing data corresponding to the wireless signal in the capture module.

25. A photographic and data transmission system for conveying information between a data unit and a camera unit, said data unit comprising:

a storage device for storing data about at least one item;

a wireless communication system for generating a wireless signal containing the data, wherein said wireless communication system is responsive to presence of the camera unit for initiating the wireless signal; and said camera unit comprising a signaling module and a capture module, said signaling module including means operative contemporaneously with operation of the capture module for signaling the wireless communication system to initiate transmission of the wireless signal, and said capture module comprising:

means for capturing an image of the item;

means for receiving the wireless signal from the wireless communication system; and means for storing the wireless signal containing data about the item.

26. A method for conveying information between a data unit near an object of interest and a camera unit brought near to the object of interest by a photographer, said method comprising the steps of:

storing data at the data unit about the object of interest;

capturing an image of the object of interest by use of the camera unit;

generating, contemporaneously with the step of capturing an image, a wireless signal from the data unit containing data about the object of interest;

receiving the wireless signal at the camera unit from the wireless communication system; and storing the wireless signal containing data about the object of interest in the camera unit.

* * * * *